Nov. 13, 1923.
H. G. WESSEL
HOSE CLAMP
Filed Jan. 10, 1923
1,473,715
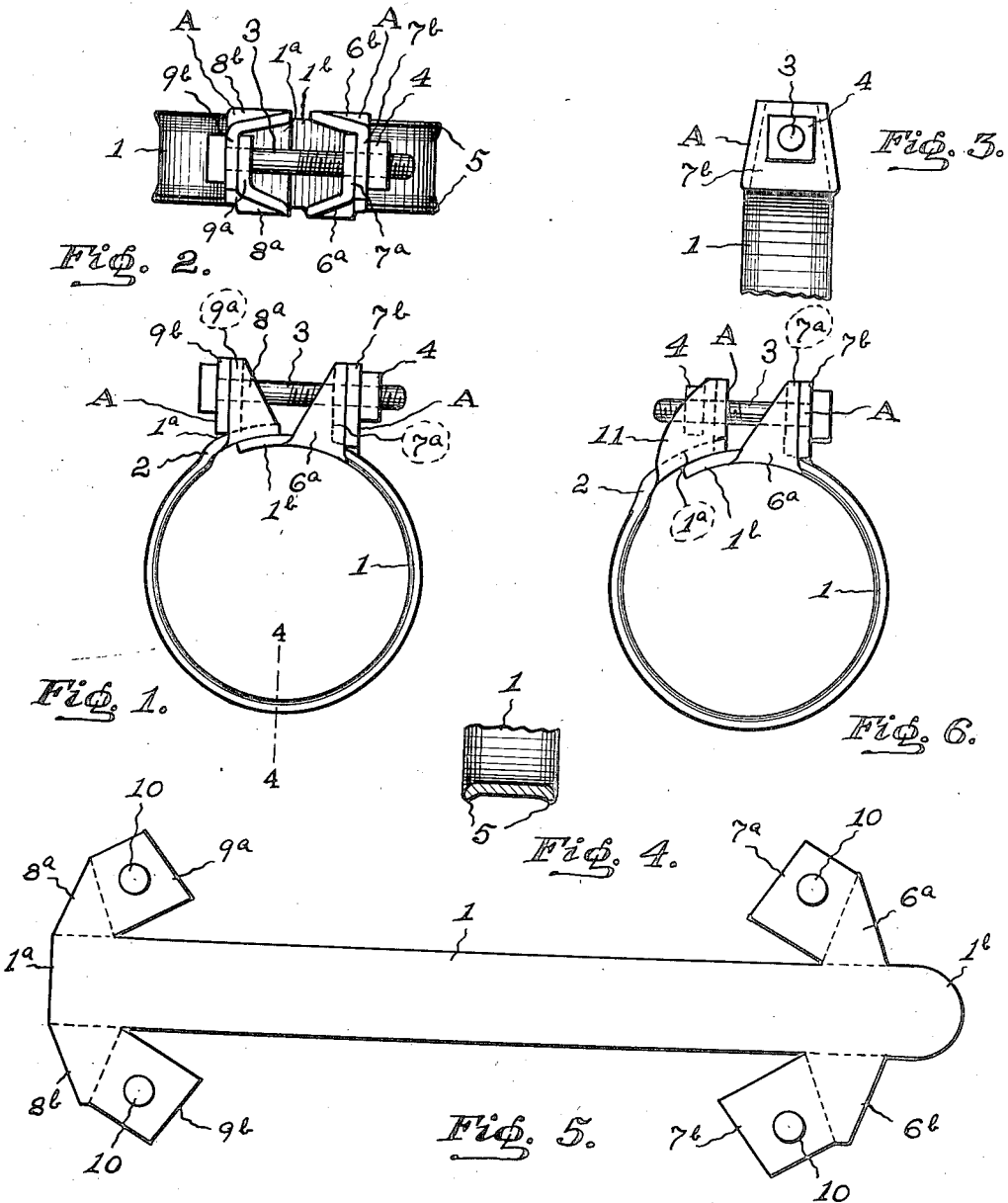
Inventor
H. G. Wessel
By Robb, Robb & Hill
Attorneys
Witness
G. Schreiner Patented Nov. 13, 1923.

1,473,715

UNITED STATES PATENT OFFICE.

HARRY G. WESSEL, OF LAKEWOOD, OHIO.

HOSE CLAMP.

Application filed January 10, 1923. Serial No. 611,708.

*To all whom it may concern:*

Be it known that I, HARRY G. WESSEL, a citizen of the United States, residing at Lakewood, in the county of Cuyahoga and State of Ohio, have invented certain new and useful Improvements in Hose Clamps, of which the following is a specification.

The present invention relates to a clamping band or ring of that general type which is adapted to be used for the purpose of connecting tubing or hose to a nipple or other coupling element.

Among the objects of the invention are to provide a clamping band of this character which embodies novel features of construction, whereby it can be inexpensively formed from sheet material, and which will at the same time have great inherent strength, so that it can be used with satisfaction for heavy work and under conditions where it may be subjected to rough handling.

While the clamping band may be used for other purposes, it is well adapted for use in connection with the air hose on the air brake systems of railway trains. A strong and heavy clamp is necessary for use in connecting the air hose to the nipples or coupling members, and the peculiar design of the present clamp gives it great inherent strength and rigidity, so that it can be successfully used for this purpose. At the same time the clamp is adapted to be formed from a blank stamped from sheet material, and the necessity of using a more expensive drop forged or cast construction is avoided.

With the foregoing and other objects in view the invention consists in certain constructions and arrangements of the parts, as will more fully appear as the description proceeds, the novel features thereof being pointed out in the appended claims.

For a full understanding of the invention reference is to be had to the following description and accompanying drawings, in which—

Figure 1 is a side elevation of one form of a hose clamp which is constructed in accordance with the invention.

Figure 2 is a top view thereof.

Figure 3 is an edge view of the upper portion of the hose clamp.

Figure 4 is a transverse sectional view on the line 4—4 of Figure 1.

Figure 5 is a plan view of the sheet metal blank from which the hose clamp is formed.

Figure 6 is a side elevation of a slightly modified form of the hose clamp.

Corresponding and like parts are referred to in the following description and indicated on all of the views of the drawing by like reference characters.

The invention is susceptible of many different embodiments, and one particular embodiment is illustrated in detail by Figures 1 to 5 inclusive, while another possible embodiment is illustrated by Figure 6. In both forms of the invention there is a strip 1 which constitutes the clamping band, being bent into a substantially circular form so that the end $1^a$ thereof overlaps the end $1^b$, the said end $1^a$ being suitably offset from the body portion of the clamping band, as indicated at 2. The two overlapping ends are provided with clamping heads A which are suitably perforated to receive a clamping bolt 3. A nut 4 is threaded upon the clamping bolt, and it will be obvious that when the clamping bolt is tightened the clamping heads A will be drawn together and the ring or band contracted, so that it can be brought into a tight engagement with a hose or like element arranged within the same. The body portion of the clamping band or strip has the inner edges thereof rounded and deflected slightly outwardly, as indicated more clearly by Figure 4, thereby avoiding sharp inner corners which might tend to cut and injure the hose or tubing and at the same time providing outstanding ribs 5 which tend to stiffen and reinforce the clamping strip.

The hose clamp shown by Figures 1 to 3 is formed by suitably bending and shaping a blank, such as that shown by Figure 5, said blank being adapted to be stamped from from sheet metal of a suitable gauge or thickness.

The end $1^b$ of the strip 1 is provided at a point slightly spaced from the extremity thereof and upon opposite sides with the upstanding side ears or webs 6ᵃ and 6ᵇ. Edge portions of these side webs are provided respectively with the clamping plates 7ᵃ and 7ᵇ which are bent inwardly so that they extend transversely across the clamping band in planes at substantially right angles to the planes of the side webs. The two clamping plates 7ᵃ and 7ᵇ fit closely together and provide a double thickness for the clamping head. In order that the two plates 7ᵃ and 7ᵇ may fit together in the proper relation when the blank is folded, it will be observed by reference to Figure 5 that the base of the side ear 6ᵇ is wider than the base of the side ear 6ᵃ by an amount equivalent to the thickness of the material from which the blank is formed. Likewise the plate 7ᵇ is wider than the plate 7ᵃ by an amount corresponding to the thickness of the material.

The opposite end of the strip is formed with similar side ears or webs 8ᵃ and 8ᵇ, although it will be noticed that the webs 8ᵃ and 8ᵇ are shorter than the corresponding webs 6ᵃ and 6ᵇ, owing to the fact that the end 1ᵃ of the strip is offset upwardly, so that it slides on top of the end 1ᵇ of the strip when the blank is bent into final shape. The side webs 8ᵃ and 8ᵇ are provided with the respective clamping plates 9ᵃ and 9ᵇ which are bent so that they extend transversely across the clamping band and fit closely against each other in a superposed relation to provide a double thickness for the clamping head. As before, the base of the side ear 8ᵇ is wider than that of the side ear 8ᵃ by an amount equal to the thickness of the sheet material, and the clamping plate 9ᵇ has a width greater than the clamping plate 9ᵃ by an amount equal to the thickness of the material.

The superposed clamping plates are preferably tapered slightly toward their upper ends, and these clamping plates are provided with corresponding openings 10 to receive the clamping bolt 3. The blank shown by Figure 5 is adapted to be folded on the parts indicated by dotted lines, and the edge portions of the side webs are at such an angle to the strip that when the clamping band assumes its final form the plates 7ᵃ and 7ᵇ will be parallel to the plates 8ᵃ and 8ᵇ. The plates can then engage the clamping bolt 3 in the most effective manner. The plates are effectively reinforced by the corresponding side webs and the superposed plates give a double thickness to those portions of the clamping heads which are in direct engagement with the bolt. An extremely strong and rigid construction is thus obtained, and when the bolt is tightened the overlapping ends of the clamping band will slide over each other and permit the band to be contracted in the usual manner when bringing it into a clamping engagement with a piece of tubing or hose to which the clamp band has been applied.

A slight modification is shown by Figure 6 in which the side webs 11 which correspond in general to the side webs 8ᵃ and 8ᵇ of the previously described embodiment of the invention extend in the opposite direction from the clamping plates. These side webs 11 are adapted to receive the nut 4 between the same and to engage the sides of the nut so that the nut is held against turning while the bolt is tightened or loosened. This may be an advantage under certain conditions. The general idea of construction is the same as that previously described, since the abutment plates of each clamping head are superposed to provide a double thickness of material at this point and are reinforced by the side webs.

While I have described two particular embodiments of the invention in detail it will be understood that many modifications and changes can be made in the details of construction without departing from the spirit and essential features of the invention.

Having thus described my invention what I claim as new and desire to secure by Letters Patent is,

1. A clamping band of the character described formed from a sheet metal blank and provided at opposite ends thereof with pairs of outstanding webs and clamping plates carried by edge portions of the webs and extending transversely across the band, the plates of each pair fitting against each other in a superposed relation to give a double thickness of material, in combination with tightening means connecting the clamping plates.

2. A clamping band of the character described formed from a sheet metal blank and provided at opposite ends thereof with pairs of outstanding webs arranged in the edge planes of the band and also with clamping plates projecting from edge portions of the side webs and extending transversely across the band, the plates being rigidly supported by the webs and the plates of each pair fitting against each other in a superposed relation and being arranged substantially parallel to the plates of the opposite pair, in combination with tightening means connecting the clamping plates.

3. A clamping band of the character described formed from a sheet metal blank and provided at opposite ends thereof with opposed clamping heads comprising a bolt engaging portion built up of superposed thicknesses of material and a stiffening web for each of the said thicknesses of material, in combination with tightening means connecting the clamping heads.

4. A clamping band of the character described formed from a sheet metal blank and provided at opposite ends thereof with opposed clamping heads, each of the clamping heads including bolt engaging plates built up from superposed thicknesses of material and an integral side stiffening web for each thickness, in combination with a bolt connecting the clamping heads and a nut engaging the bolt and held against rotation by engagement with certain of the side stiffening webs.

In testimony whereof I affix my signature.

HARRY G. WESSEL.